United States Patent [19]

Castner

[11] Patent Number: 5,089,574
[45] Date of Patent: Feb. 18, 1992

[54] TRANS-1,4-POLYBUTADIENE SYNTHESIS

[75] Inventor: Kenneth F. Castner, Uniontown, Ohio

[73] Assignee: The Goodyear Tire & Rubber Company, Akron, Ohio

[21] Appl. No.: 601,100

[22] Filed: Oct. 22, 1990

[51] Int. Cl.$^5$ .............................................. C08F 4/70
[52] U.S. Cl. .................... 526/142; 502/117; 526/146; 526/348.6
[58] Field of Search ........................ 526/142, 146, 136

[56] References Cited

U.S. PATENT DOCUMENTS

| | | | |
|---|---|---|---|
| 3,928,297 | 12/1975 | Thaler et al. | 526/339 |
| 4,153,767 | 5/1979 | Ueno et al. | 526/141 |
| 4,340,685 | 7/1982 | Takeuchi et al. | 526/79 |
| 4,501,867 | 2/1985 | Ueno et al. | 526/136 |
| 4,503,202 | 3/1985 | Ueno et al. | 526/136 |

FOREIGN PATENT DOCUMENTS 42-187 10/1967 Japan .

*Primary Examiner*—Patrick P. Garvin
*Attorney, Agent, or Firm*—Alvin T. Rockhill

[57] ABSTRACT

Trans-1,4-polybutadiene is a thermoplastic resin by virtue of its high level of crystallinity. Because trans-1,4-polybutadiene contains many double bonds in its backbone, it can be blended and cocured with rubbers. Even through trans-1,4-polybutadiene is a thermoplastic resin, it becomes elastomeric when cured alone or when cocured with one or more rubbers. By utilizing the catalyst system and techniques of this invention, trans-1,4-polybutadiene can be synthesized continuously to a high level of conversion with only minimal amounts of gel formation. This invention specifically relates to a process for synthesizing trans-1,4-polybutadiene in a continuous process which comprises continuously charging 1,3-butadiene monomer, an organocobalt compound, an organoaluminum compound, a para-substituted phenol, carbon disulfide, and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone. It is highly preferred for the para-alkyl substituted phenol utilized in this process to contain from about 12 to about 26 carbon atoms.

18 Claims, No Drawings

TRANS-1,4-POLYBUTADIENE SYNTHESIS

BACKGROUND OF THE INVENTION

Trans-1,4-polybutadiene (TPBD) is a thermoplastic resin by virtue of its high level of crystallinity. Because it contains many double bonds in its polymeric backbone, it can be blended and cocured with rubber. TPBD is similar to syndiotactic-1,2-polybutadiene in this respect.

TPBD is normally prepared utilizing transition metal catalysts or rare earth catalysts. The synthesis of TPBD with transition metal catalysts is described by J. Boor Jr., "Ziegler-Natta Catalysts and Polymerizations", Academic Press, New York, 1979, Chapters 5–6. The synthesis of TPBD with rare earth catalysts is described by D. K. Jenkins, Polymer, 26, 147 (1985). However, molecular weight control is difficult to achieve with such transition metal or rare earth catalysts and monomer conversions are often very modest.

Better molecular weight control could be achieved by utilizing an anionic polymerization system to produce the TPBD. There is typically an inverse relationship between the catalyst level utilized and the molecular weight attained when anionic polymerization systems are used. Such an anionic polymerization system is disclosed in U.S. Pat. No. 4,225,690. The catalyst system disclosed therein is based on a dialkylmagnesium compound which is activated with a potassium alkoxide. However, only a minor amount of the polymer produced with such dialkyl magnesium based catalyst systems is TPBD. In other words, the small amount of TPBD produced utilizing such catalyst systems is always accompanied by major amounts of hexane-soluble polybutadiene of mixed microstructure.

SUMMARY OF THE INVENTION

Japanese Patent Application No. 67187-1967 discloses a catalyst system and technique for synthesizing TPBD consisting of 75 to 80% trans-1,4-structure and 20 to 25% 1,2-structure. The catalyst system described by this reference consists of a cobalt compound having a cobalt organic acid salt or organic ligand, an organoaluminum compound and phenol or naphthol. Gel formation is a serious problem which is frequently encountered when this three component catalyst system is utilized in the synthesis of TPBD. Gelation is a particularly serious problem in continuous polymerizations. By utilizing the catalyst system and techniques of this invention, TPBD can be synthesized in a continuous process with only minimal amounts of gel formation.

This invention is based upon the unexpected finding that carbon disulfide will act as a gel inhibitor in conjunction with three component catalyst systems which contain an organocobalt compound, an organoaluminum compound and a para-alkyl substituted phenol. It has also been unexpectedly found that conversions can be substantially improved by utilizing para-alkyl substituted phenols which contain from about 12 to about 26 carbon atoms. In other words, these preferred para-alkyl substituted phenols have alkyl groups which contain from about 6 to about 20 carbon atoms.

The subject invention specifically discloses a catalyst system which can be utilized int he polymerization of 1,3-butadiene monomer into trans-1,4-polybutadiene, said catalyst system being comprised of an organocobalt compound, an organoaluminum compound, a para-alkyl substituted phenol which contains from about 12 to about 26 carbon atoms, and carbon disulfide.

The present invention further reveals a process for synthesizing trans-1,4-polybutadiene in a continuous process which comprises continuously charging 1,3-butadiene monomer, an organocobalt compound, an organoaluminum compound, a para-substituted phenol, carbon disulfide, and an organic solvent into a reaction zone; allowing the 1,3-butadiene monomer to polymerize in said reaction zone to form the trans-1,4-polybutadiene; and continuously withdrawing the trans-1,4-polybutadiene from said reaction zone.

This invention also discloses in a process for the synthesis of trans-1,4-polybutadiene by polymerizing 1,3-butadiene monomer in the presence of a catalyst system which includes an organocobalt compound, an organoaluminum compound, and a para-alkyl substituted phenol, the improvement which comprises conducting the polymerization in the presence of carbon disulfide as a gel inhibitor.

DETAILED DESCRIPTION OF THE INVENTION

The polymerizations of the present invention will normally be carried out in a hydrocarbon solvent which can be ne or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cycloheane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerizations of this invention, there will normally be from 5 to 30 weight percent 1,3-butadiene monomer in the polymerization medium. Such polymerization media are, of course, comprised of the organic solvent and 1,3-butadiene monomer. In most cases, it will be preferred for the polymerization medium to contain from 10 to 25 weight percent monomer. It is generally more preferred for the polymerization medium to contain 15 to 20 weight percent 1,3-butadiene monomer.

It has been found that the microstructure of the TPBD varies with the monomer concentration utilized in its synthesis. Lower monomer concentrations in the polymerization medium result in higher trans contents. As the concentration of 1,3-butadiene monomer in the polymerization medium is increased, the level of trans-1,4 structure decreases. For instance, at a 1,3-butadiene monomer concentration of 5 weight percent, trans contents of about 84% are typical. At monomer concentrations of 17%, trans contents of about 80% are typical. In cases where the polymerization medium contains about 30 weight percent monomer, TPBD having a trans content of only about 68% is generally produced.

Such polymerizations can be carried out utilizing batch, semi-continuous, or continuous techniques. In a continuous process additional 1,3-butadiene monomer, catalyst, and solvent are continuously added to the reaction zone (reaction vessel). The polymerization temperature utilized will typically be within the range of about 50° C. to about 125° C. It is normally preferred for the polymerization medium to be maintained at a temperature which is within the range of about 65° C. to about 100° C. throughout the polymerization. It is typically most preferred for the polymerization temperature to be within the range of about 70° C. to about 85° C. The pressure used will normally be sufficient to maintain a substantially liquid phase under the conditions of the polymerization reaction.

The polymerization is conducted for a length of time sufficient to permit substantially complete polymerization of the 1,3-butadiene monomer. In other words, the polymerization is normally carried out until high conversions are realized. In commercial operations, conversions in excess of about 80% will normally be attained. The polymerization can then be terminated using a standard procedure.

The organocobalt compounds utilized in the catalyst systems of this invention are typically cobalt salts or cobalt containing organic acids which contain from 1 to about 20 carbon atoms. Some representative examples of suitable organocobalt compounds include cobalt benzoate, cobalt acetate, cobalt naphthenate, cobalt octanoate, cobalt neodecanoate, bis($\alpha$-furyl dioxime) cobalt, cobalt palmitate, cobalt stearate, cobalt acetylacetonate, cobalt salicaldehyde, bis(cyclopentadiene) cobalt, cyclopentadienyl-cobalt nitrosyl, bis($\pi$-allyl cobalt), bis($\pi$-allyl cobalt trifluoroacetate), and cobalt tetracarbonyl. Cobalt naphthenate, cobalt octanoate, and cobalt neodecanoate are highly preferred organocobalt compounds. Cobalt 2-ethylhexanoate, which is commonly referred to as cobalt octanoate (CoOct) is the organocobalt compound which is most commonly used due to economic factors.

The organoaluminum compounds that can be utilized typically have the structural formula:

in which $R_1$ is selected from the group consisting of alkyl groups (including cycloalkyl), aryl groups, alkaryl groups, arylalkyl groups, alkoxy groups, and hydrogen; $R_2$ and $R_3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum and diisobutyl aluminum hydride (DIBA-H). Halogens, such as fluorine, chlorine, bromine and iodine, and halogen containing compounds have been found to be poisons and are detrimental to the polymerizations of this invention. The polymerizations of this invention will accordingly be conducted in the absence of significant quantities of halogens and halogen containing compounds.

The para-alkyl substituted phenols which can be utilized generally have the structural formula:

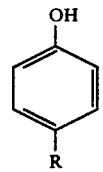

wherein R is an alkyl group which contains from about 6 to about 20 carbon atoms. Such para-alkyl substituted phenols accordingly contain from about 12 to about 26 carbon atoms. In most cases the alkyl group in the para-alkyl substituted phenol will contain from about 8 to about 18 carbon atoms. Such para-alkyl substituted phenols contain from about 14 to about 24 carbon atoms. It is typically preferred for the alkyl group in the para-alkyl substituted phenol to contain from about 9 to about 14 carbon atoms. Such para-alkyl substituted phenols contain from about 15 to about 20 carbon atoms. Exceptionally good results can be attained utilizing para-alkyl substituted phenols having alkyl groups which contain 12 carbon atoms. These highly preferred para-alkyl substituted phenols contain 18 carbon atoms.

The polymerizations of this invention are initiated by charging the catalyst components into the polymerization medium. The amount of organocobalt compound utilized will typically be within the range of about 0.01 phm to about 0.5 phm (parts per hundred parts of 1,3-butadiene monomer). It is generally preferred for the organocobalt compound to be employed at a level which is within the range of about 0.05 phm to about 0.25 phm. It is generally more preferred for the organocobalt compound to be utilized in an amount within the range of about 0.1 phm to about 0.15 phm. The organocobalt compound can be charged directly into the polymerization medium containing the 1,3-butadiene monomer.

The organoaluminum compound will be employed in an amount sufficient to attain a molar ratio of the organoaluminum compound to the organocobalt compound which is within the range of about 1 to about 40. It is typically preferred for the molar ratio of the organoaluminum compound to the organocobalt compound to be within the range of about 2 to about 20. It is more preferred for the ratio of the organoaluminum compound to the organocobalt compound to be within the range of about 4 to about 8.

It is highly preferred for the para-alkyl substituted phenol to be "prereacted" with the organoaluminum compound prior to charging it into the polymerization medium. This can be accomplished by simply mixing the para-alkyl substituted phenol with the organoaluminum compound prior to their introduction into the reaction zone. The molar ratio of the para-alkyl substituted phenol to the organoaluminum compound will typically be within the range of about 2 to about 3. It is generally preferred for the molar ratio of the para-alkyl substituted phenol to the organoaluminum compound to be within the range of about 2.25 to about 2.75. It is generally most preferred for the ratio of the para-alkyl substituted phenol to the organoaluminum compound to be within the range of about 2.4 to about 2.6.

It is very important for the carbon disulfide to be introduced into the polymerization medium as a separate component. In other words, the carbon disulfide is added "in situ" to the reaction zone by charging it separately from the other components. In most cases, the organocobalt compound will also be added to the polymerization medium as a separate component.

The molar ratio of the carbon disulfide to the organocobalt compound will generally be within the range of about 0.05 to about 1. Molar ratios of carbon disulfide to the organocobalt compound less than 0.05:1 may not be effective to inhibit gel formation. Molar ratios of carbon disulfide to the organocobalt compound of greater than 1:1 reduce conversions (yields) significantly. As a general rule, it will be preferred for the molar ratio of carbon disulfide to the organocobalt compound to be within the range of about 0.1 to about 0.5. It is typically more preferred for the molar ratio of carbon disulfide to the organocobalt compound to be within the range of about 0.2 to about 0.3.

In the TPBD produced by the process of this invention, at least about 65% of the butadiene repeat units in the polymer are of the trans-1,4-isomeric structure. The TPBD made utilizing the catalyst system of this invention typically has a trans-isomer content of at least about 70%. In most cases the TPBD made by the process of this invention will have a trans-isomer content which is within the range of about 75% to about 85%.

The polymerizations of this invention result in the formation of solutions containing the TPBD. Standard techniques can be utilized to recover the TPBD from the solution in which it is dissolved. Coagulation techniques will typically be employed to recover the TPBD from the organic solvent. Such coagulation procedures typically involve the addition of an alcohol or ketone to the TPBD solution to induce coagulation. However, the TPBD can also be recovered from the organic solvent by evaporation procedures. Such evaporation procedures typically involve heating the polymer solution to a slightly elevated temperature in conjunction with the application of vacuum.

The TPBD made utilizing the techniques of this invention is a thermoplastic resin. It can be molded into various useful articles. Because the TPBD contains many double bonds in its backbone, it can also be blended and cocured with rubbers. Despite the fact that TPBD is a thermoplastic resin, it becomes elastomeric when cured alone or when cocured with one or more rubbers. TPBD has the ability to strain crystallize which improves properties, such as tensile strength, tear strength and flex fatigue. It can accordingly be used in manufacturing rubber articles such as hoses, belts and tires which have improved performance characteristics.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment TPBD was synthesized in a continuous process with carbon disulfide being utilized as a gel inhibitor. A three reactor system was employed in carrying out the polymerization. This three reactor system consisted of one one-gallon (3.79 liter) reactor and two two-gallon (7.58 liter) reactors which were constructed from six inch (15.2 cm) diameter and eight inch (20.3 cm) diameter stainless steel pipes which were 3/16 inch (4.8 mm) thick, respectively. All of the reactors had dish bottoms and were equipped with four vertical baffles (1.27 cm radial width) traversing the entire reactor wall. All of the reactors were equipped with two axial flow turbines (AFTs) spaced ⅛ and ⅝ from the dish bottom. Pitch was set to pump the reaction mixture up-flow along the agitator shaft. The one-gallon (3.79 liter) reactor and two-gallon (7.58 liter) reactors contained agitators having diameters of 5 inches (12.7 cm) and 6.5 inches (16.5 cm), respectively. Heat transfer was provided by external jackets of ⅜ inch (0.95 cm) thermanized copper coils surrounding the walls and bottom dishes. Each reactor was fitted with reaction and interior wall thermocouples and jacket cooling water thermocouples to allow for the determination of relative heat transfer and polymer fouling of the reactors during the polymerization.

In the procedure utilized, the 1,3-butadiene monomer, hexane (the solvent), the catalyst components and the carbon disulfide were charged into the one-gallon (3.79 liter) reactor. These components were continuously fed into the one-gallon (3.79 liter) reactor at a rate which resulted in a residence time in the one-gallon (3.79 liter) reactor (first reactor) of about 45 minutes. The residence time in the two-gallon (7.58 liter) reactor system was accordingly about 1.5 hours. The 1,3-butadiene monomer was charged into the one-gallon reactor as a 15% solution in hexane which had been passed over a molecular sieve and alumina. Cobalt octanoate was fed into the one-gallon (3.79 liter) reactor at a rate sufficient to maintain a concentration of about 0.26 phm. Para-dodecylphenol was mixed with triethylaluminum prior to being charged into the first reactor. The molar ratio of para-dodecylphenol to triethylaluminum was 2.5:1. This para-dodecylphenol/triethylaluminum preformed catalyst component was fed into the first reactor at a rate of 0.52 phm. Carbon disulfide was charged into the one-gallon (3.79 liter) reactor at a rate which was sufficient to maintain a molar ratio of carbon disulfide to cobalt octanoate of 0.25:1. The temperature of the reactors was maintained at about 98° C. with the agitators being set to run at 145 rpm (revolutions per minute).

This continuous polymerization process was continued for a period of 200 hours. During this continuous polymerization, gelation was not a problem. The polymer produced was determined to be TPBD which had a melting point of about 38° C. and a glass transition temperature of about −75° C. At the 0.25:1 molar ratio of carbon disulfide to cobalt octanoate, a conversion of 82% was realized. When the molar ratio of carbon disulfide to cobalt octanoate was increased to 0.28:1, conversions of only about 68% were attained. This experiment shows that TPBD can be synthesized in a continuous process utilizing the catalyst system and techniques of this invention.

COMPARATIVE EXAMPLE 2

The polymerization reactors and general technique described in Example 1 was utilized in this experiment except that the carbon disulfide was not utilized. This continuous polymerization was plagued by gelation in the reactors and transfer lines. When the reactors were dismantled for inspection, they were found to be severely fouled with polymer which had to be physically cut and pulled from the reactor walls and parts. The transfer lines were discarded and replaced due to the difficulties associated with removing the stiff polymer gel therefrom.

This comparative experiment clearly shows that gelation is a very serious problem in cases where carbon disulfide is not utilized as a gel inhibiting agent. In large scale commercial operations, gelation of the type experienced in this experiment would not be tolerable.

COMPARATIVE EXAMPLE 3

It is well known to utilize 1,2-butadiene as a gel inhibitor in polymerizations which are initiated with lithium catalysts. Accordingly, in this experiment, an attempt was made to utilize 1,2-butadiene as a gel inhibitor for producing TPBD. Accordingly, in this experiment, the equipment and procedures specified in Example 1 were repeated except that 1,2-butadiene was substituted for the carbon disulfide utilized in Example 1. In this procedure, gel was observed in the one-gallon (3.79 liter) reactor about 12 hours after initiation. The polymerization was terminated after about 14 hours and the reactors were found to be heavily fouled with polymer build-up. In some places, the gel build-up was up to 1.5 inches (3.81 cm) in thickness and could not be dissolved with solvents. The polymer gel had to be physically cut and pulled from the reactor walls and parts. This experiment clearly shows that 1,2-butadiene is not effective as a gel inhibiting agent.

While certain representative embodiments and details have been shown for the purpose of illustrating the present invention, it will be apparent to those skilled in this art that various changes and modifications can be made therein without departing from the scope of the present invention.

What is claimed is:

1. In a process for the synthesis of trans-1,4-polybutadiene by polymerizing 1,3-butadiene monomer in the presence of a catalyst system which includes an organocobalt compound, an organoaluminum compound, and a para-alkyl substituted phenol wherein the organocobalt compound is present at a level which is within the range of about 0.01 phm to about 0.5 phm, the improvement which comprises conducting the polymerization int he presence of carbon disulfide as a gel inhibitor wherein the molar ratio of the carbon disulfide to the organocobalt compound is within the range of about 0.05 to about 1.

2. A process for synthesizing trans-1,4-polybutadiene in a continuous process which comprises continuously charging 1,3-butadiene monomer, an organocobalt compound, an organoaluminum compound, a para-substituted phenol, carbon disulfide, and an organic solvent into a reaction zone, wherein the organocobalt compound is present at a level which is within the range of about 0.01 phm to about 0.5 phm, and wherein the molar ratio of the carbon disulfide to the organocobalt compound is within the range of about 0.05 to about 1; allowing the 1,3-butadiene monomer to polymerize in said reaction zone to form the trans-1,4-polybutadiene; and continuously withdrawing the trans-1,4-polybutadiene from said reaction zone.

3. A process as specified in claim 2 wherein the 1,3-butadiene monomer in the reaction zone is at a concentration which is within the range of about 5% to about 30%, based upon the total weight of the 1,3-butadiene monomer and organic solvent in the reaction zone: and wherein the temperature in the reaction zone is within the range of about 50° C. to about 100° C.

4. A process as specified in claim 2 wherein the organocobalt compound is present at a level which is within the range of about 0.01 phm to about 0.5 phm.

5. A process as specified in claim 2 wherein the organocobalt compound is present at a level which is within the range of about 0.05 phm to about 0.25 phm.

6. A process as specified in claim 2 wherein the organocobalt compound is present at a level which is within the range of about 0.1 phm to about 0.15 phm.

7. A process as specified in claim 2 wherein the 1,3-butadiene monomer is polymerized at a temperature which is within the range of about 65° C. to about 85° C.

8. A process as specified in claim 2 wherein the 1,3-butadiene monomer in the reaction zone is at a concentration which is within the range of about 10% to about 25%, based upon the total weight of the 1,3-butadiene monomer and organic solvent in the reaction zone.

9. A process as specified in claim 2 wherein the 1,3-butadiene monomer in the reaction zone is at a concentration which is within the range of about 15% to about 20%, based upon the total weight of the 1,3-butadiene monomer and organic solvent int he reaction zone.

10. A process as specified in claim 2 wherein the para-alkyl substituted phenol contains from about 15 to about 20 carbon atoms.

11. A process as specified in claim 5 wherein the molar ratio of the para-alkyl substituted phenol to the organoaluminum compound is within the range of about 2.25 to about 2.75; wherein the molar ratio of the carbon disulfide to the organocobalt compound is within the range of about 0.1 to about 0.5; and wherein the molar ratio of the organoaluminum compound to the organocobalt compound is within the range of about 2 to about 20.

12. A process as specified in claim 11 wherein the para-alkyl substituted phenol is para-dodecylphenol.

13. A process as specified in claim 1 wherein the para-alkyl substituted phenol contains from about 14 to about 20 carbon atoms.

14. A process as specified in claim 13 wherein the molar ratio of the para-alkyl substituted phenol to the organoaluminum compound is within the range of about 2.25 to about 2.75; wherein the molar ratio of the carbon disulfide to the organocobalt compound is within the range of about 0.1 to about 0.5; and wherein the molar ratio of the organoaluminum compound to the organocobalt compound is within the range of about 2 to about 20.

15. A process as specified in claim 14 wherein the organoaluminum compound is a trialkylaluminum compound and wherein the organocobalt compound is selected from the group consisting of cobalt naphthenate, cobalt octanoate and cobalt neodecanoate.

16. A process as specified in claim 15 wherein the para-alkyl substituted phenol contains from about 15 to about 20 carbon atoms.

17. A process as specified in claim 16 wherein the molar ratio of the para-alkyl substituted phenol to the organoaluminum compound is within the range of 2.4 to about 2.6; wherein the molar ratio of the carbon disulfide to the organocobalt compound is within the range of about 0.2 to about 0.3; and wherein the molar ratio of the organoaluminum compound to the organocobalt compound is within the range of about 4 to about 8.

18. A process as specified in claim 17 wherein the para-alkyl substituted phenol is para-dodecylphenol.

* * * * *